US005995001A

United States Patent [19]

Wellman et al.

[11] Patent Number: 5,995,001

[45] Date of Patent: Nov. 30, 1999

[54] METHOD AND APPARATUS FOR PROVIDING OPERATING INFORMATION TO AN OPERATOR OF A FORK LIFT TRUCK

[75] Inventors: Timothy A. Wellman, Coldwater; Daniel C. Magoto, Russia, both of Ohio

[73] Assignee: Crown Equipment Corporation, New Bremen, Ohio

[21] Appl. No.: 09/108,735

[22] Filed: Jul. 1, 1998

Related U.S. Application Data

[60] Provisional application No. 60/053,077, Jul. 9, 1997.

[51] Int. Cl.$^{6}$ .......................................... B60Q 1/00

[52] U.S. Cl. .......................... 340/438; 340/440; 340/685; 340/691.2; 340/691.4

[58] Field of Search .................................... 340/438, 440, 340/689, 686, 691, 685; 414/634, 273, 635

[56] References Cited

U.S. PATENT DOCUMENTS

| | | | |
|---|---|---|---|
| 2,935,161 | 5/1960 | Comfort | 187/224 |
| 4,511,974 | 4/1985 | Nakane et al. | 364/463 |
| 4,517,645 | 5/1985 | Yuki et al. | 364/424 |
| 4,942,529 | 7/1990 | Avitan et al. | 364/424.01 |
| 5,011,358 | 4/1991 | Andersen et al. | 414/273 |
| 5,131,801 | 7/1992 | Melanson | 414/635 |
| 5,749,696 | 5/1998 | Johnson | 414/635 |

FOREIGN PATENT DOCUMENTS

| | | |
|---|---|---|
| 0 343 839 | 11/1989 | European Pat. Off. . |
| 2 499 053 | 8/1982 | France . |
| 2 499 961 | 8/1982 | France . |
| 92 04 332 | 5/1992 | Germany . |
| 1 258 081 | 12/1971 | United Kingdom . |

*Primary Examiner*—Daniel J. Wu
*Assistant Examiner*—Sihong Huang
*Attorney, Agent, or Firm*—Killworth, Gottman, Hagan & Schaeff LLP

[57] ABSTRACT

A fork lift truck capacity monitor or alerting device informs operators of the weight on the forks and fork height and alerts operators whenever truck speed is above creep with the forks raised above a collapsed height or whenever the forks are raised above a recommended height for a given load. The alerting device includes a control circuit that receives inputs from a speed sensor, a fork height sensor and a weight sensor and reads a memory storing data correlating load weights with maximum recommended fork heights. A truck icon is displayed on a display panel. A plurality of height zone lamps representing the weight of the load on the forks are arranged in a vertical column over the truck icon and selectively illuminated according to the load on the forks. A plurality of lamps represent the height of the forks with the fork height lamps, which include one lamp positioned to represent a lowered position of the forks and a plurality of lamps equal in number to the height zone lamps and placed horizontally opposite therefrom, being selectively illuminated according to the height of the forks. An alarm signal alerts operators whenever the forks are raised above the recommended height for a given load weight, or whenever truck speed exceeds a predetermined maximum speed and the forks are above the collapsed height. The alarm signal may include a combination of an audible signal, a text message, and a flashing lamp.

23 Claims, 10 Drawing Sheets

METHOD AND APPARATUS FOR PROVIDING OPERATING INFORMATION TO AN OPERATOR OF A FORK LIFT TRUCK

CROSS-REFERENCE TO RELATED APPLICATIONS

This application claims the benefit of U.S. Provisional Application No. 60/053,077, filed Jul. 9, 1997, which is incorporated herein by reference.

BACKGROUND OF THE INVENTION

This invention relates to an improved method and apparatus for providing information to a fork lift truck operator regarding the vertical position of forks of the truck, the height to which the forks can be raised for a given load and the speed of the truck by means of a display and an audible alarm.

Fork lift trucks, such as rider reach lift trucks, are often provided with a placard or plate on which capacity information is placed, e.g., information as to how high the forks may be raised with various loads on the forks. A capacity plate may include a table which states load weight versus recommended fork height indicating for a given truck that a load of 2500 pounds may be lifted to a recommended maximum height of 321 inches, a load of 3000 pounds may be lifted to a recommended maximum height of 300 inches, a load of 4000 may be lifted to a recommended maximum height of 270 inches, and so forth. It is apparent that such information can be used by the operator to determine heights to which a given load can be lifted and/or load size which can be lifted to a given height. The center of the load is also an important consideration. For example, if a load is moved from 24 inches forward of the mast to 34 inches forward of the mast, the load capacity may be reduced from 3000 pounds to 2100 pounds.

There is a need for a more convenient, attention getting, way of providing an operator with the information necessary to operate a fork lift truck to assist the operator in estimating or determining the weight of the load, the height of the forks and the speed of the truck.

SUMMARY OF THE INVENTION

In the present invention, the speed of the truck, the weight of the load on the forks and the height of the forks are monitored and compared with capacity data regarding the truck. A visual display panel is provided to make clear to an operator of the truck the maximum recommended fork height for an existing load. The invention also provides a visual indication whenever the forks are raised above a staging or collapsed height, i.e., the top of a lowermost mast member, and alerts the operator using flashing lights and audible alarms when certain other conditions are present.

A display panel includes, among other things, a representation of a lift truck, a set of four indicators above the truck representing the load on the forks and hence a maximum recommended fork height for that load; a second set of five indicators in the form of forks representing the height of the forks, one of which represents the forks below the staging or collapsed height; and, a visual indicator representing an operator correctable error. The truck is also provided with a chime or other audible alarm device and a text display screen for providing the operator with written instructions, when necessary.

It is therefore an object of the present invention to provide a method and apparatus for displaying information to the operator of a lift truck relating to the actual height of the forks and a maximum recommended height to which the forks should be raised with an existing load.

It is another object of the present invention to provide a method and apparatus for providing a visual indication whenever the forks are raised above the collapsed height; and further, to provide an alarm whenever the forks are raised above the collapsed height and the speed of the truck is above a predetermined speed. Preferably, the alarm provides both a visual and an audible alarm whenever the forks are raised above the collapsed height and the speed of the truck is above a predetermined speed.

Other objects and advantages of the invention will be apparent from the following description, the accompanying drawings and the appended claims.

DETAILED DESCRIPTION OF THE INVENTION

Figure 1:
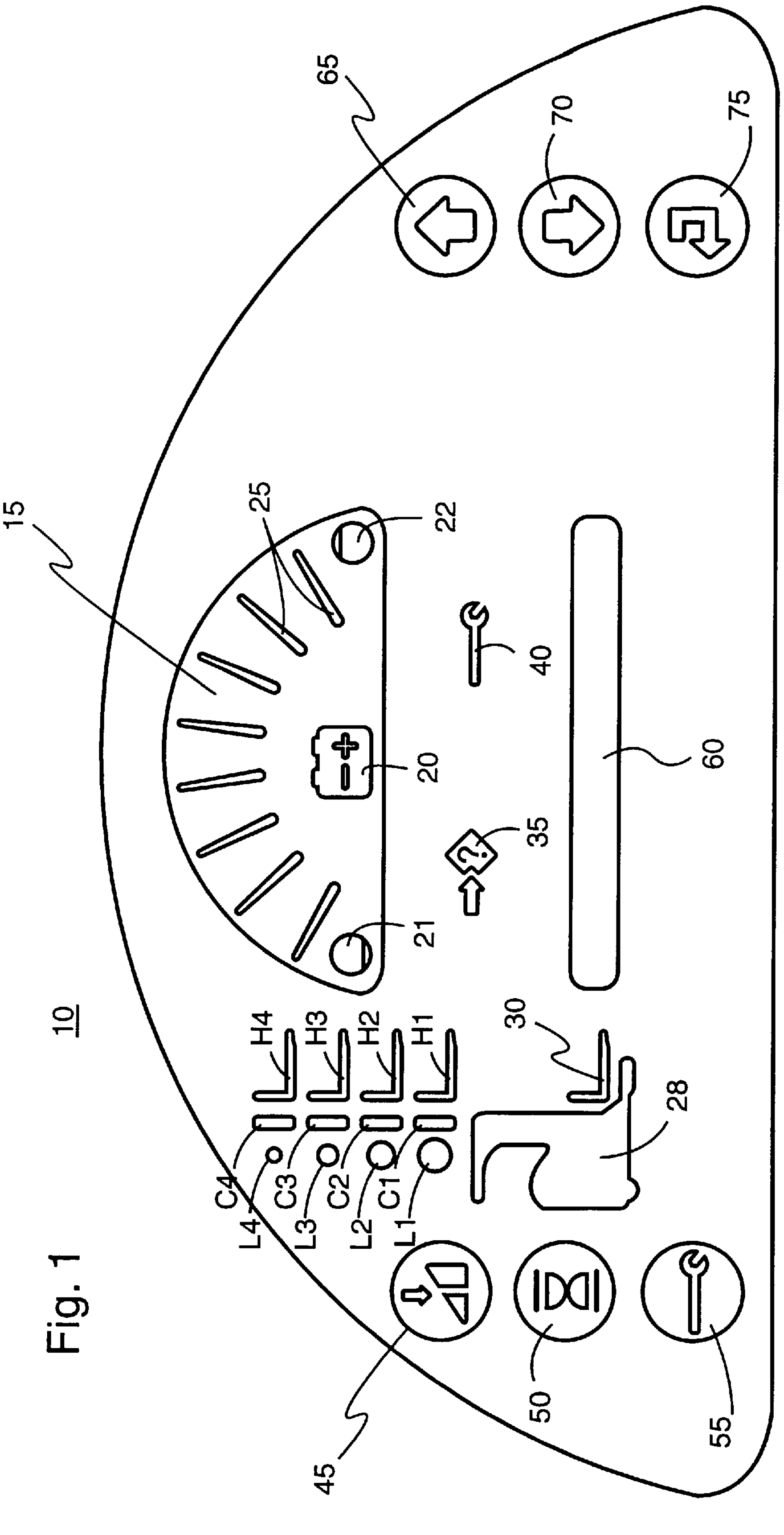
FIG. 1 illustrates an enhanced display panel for a lift truck incorporating a first embodiment of the present invention and showing various indicators for use by the operator, including a battery level indicator, several height zone indicators, several fork location indicators including a free lift zone indicator, an operator correctable error indicator, and a text display screen.

Reference is now made to the drawings and particularly to FIG. 1, which is a view of a display panel 10 on an electric powered lift truck showing various indicators for use by an operator of the truck. Included on the display panel 10 is a battery voltage level indicator 15 (a type of fuel gauge) that is provided with a symbol 20 that represents a battery, a symbol 21 that represents a discharged battery and a symbol 22 that represents a charged battery. A plurality of indicator lamps 25 show the actual state of charge of the battery. It is noted that while the term "lamp" is used to refer to indicators which are illuminated or flashed, lamp is intended to include light emitting diodes (LED's) and any other form of illumination device now in existence or later developed which is immediately or remotely associated with the area to be illuminated, for example by fiber optics.

A lift truck representation 28 is formed on the display panel 10. Associated with the lift truck representation 28 are a set of disks L1–L4 that size-wise represent the maximum permissible load at different heights of the forks; several height zone indicator lamps C1–C4, which indicate the recommended height range to which the forks of the lift truck should be raised for a given actual load on the forks; and, fork height lamps H1–H4 and 30 which represent the actual height of the forks with the fork height lamp 30 indicating when the forks are in a free lift zone beneath the collapsed height for the truck. Also on the display panel 10 are an operator correctable error indicator 35 (an ISO standard symbol), a maintenance needed indicator 40, a performance tune pushbutton 45, a truck hour usage pushbutton 50 represented by a stylized hourglass symbol, a maintenance pushbutton 55, a text display screen 60, and three push buttons 65, 70 and 75 for controlling the input of data to the text display screen 60.

Figure 2:
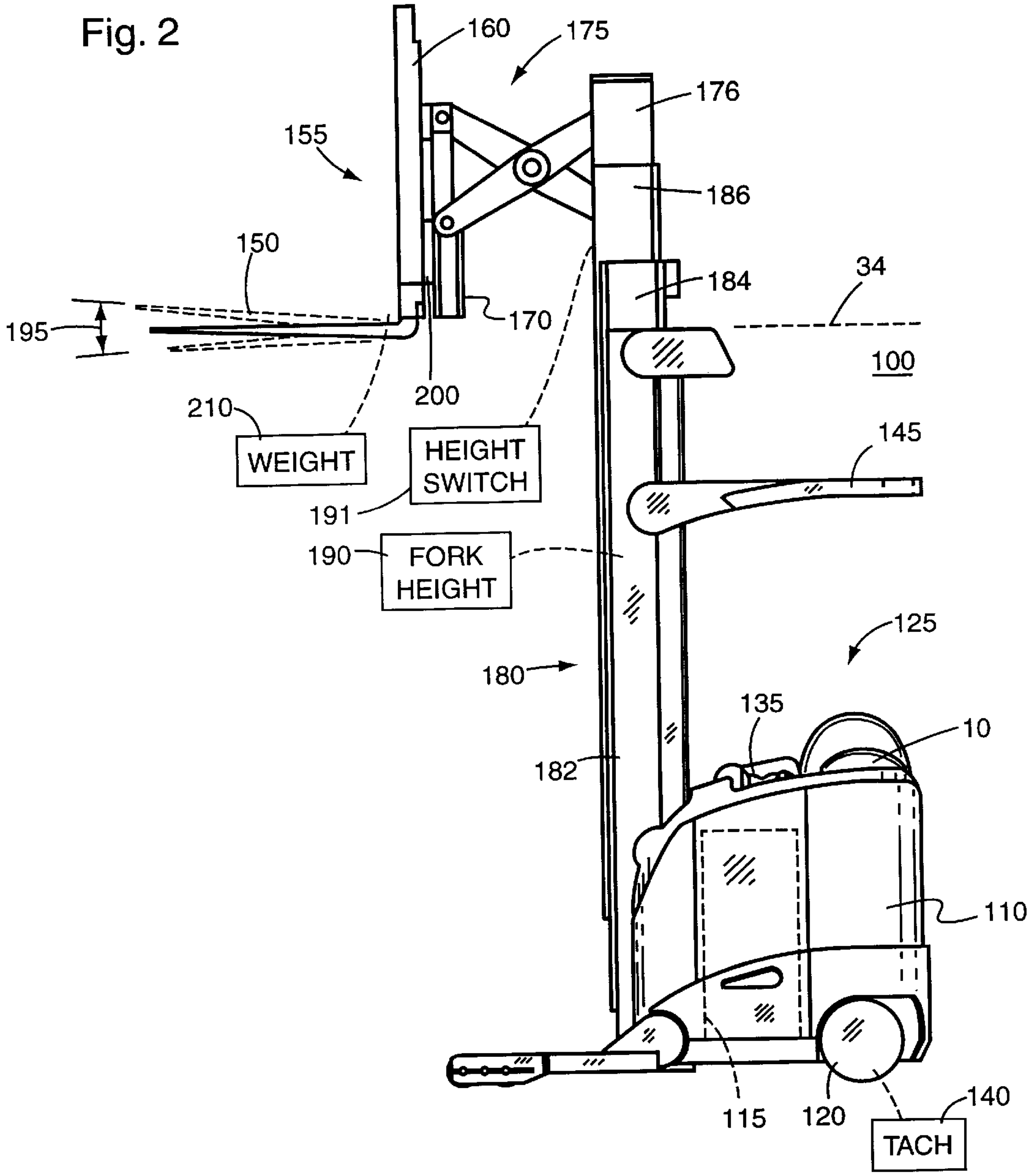
FIG. 2 is a side view of a typical rider reach lift truck.

FIG. 2 illustrates a typical rider reach fork lift truck 100, such as Series RR or RD lift trucks manufactured by Crown Equipment Corporation, the assignee of the present application. The truck 100 includes a power unit 110 which houses a battery 115 for supplying power to a traction motor (not shown) connected to a steerable wheel 120 and to hydraulic motors (not shown) which supply power to several different systems, such as mast, fork and reach hydraulic cylinders. An operator's compartment 125 in the power unit 110 is provided with a steering tiller (not shown) for controlling the direction of travel of the truck 100, and a control handle 135 for controlling travel speed and direction as well as fork height, extension, and tilt. The speed of the truck 100 is measured by a tachometer, represented at 140, included within the truck 100 in a conventional manner. An overhead guard 145 is placed over the operator's compartment 125.

A pair of forks 150 are mounted on a fork carriage mechanism 155 which is in turn mounted on a carriage assembly 170. A load back rest 160 is provided, as shown. As described in U.S. Pat. No. 5,586,620 which is incorporated herein by reference, the carriage assembly 170 is attached to an extensible mast assembly 180 by a scissors reach mechanism 175 extending between the carriage assembly 170 and a reach support 176. The reach support 176 is mounted to the mast assembly 180 which includes a fixed, lower mast member 182 and nested movable mast members 184 and 186. A hydraulic cylinder (not shown) is operated by control handle 135 to control the height of the forks 150. As shown in FIG. 2, the mast is raised and the reach mechanism 175 is extended.

The height of the forks 150 is measured by a digital encoder, represented at 190, which may be similar to the device shown in U.S. Pat. No. 5,103,226 which is incorporated herein by reference. In the illustrated embodiment, the height of the forks 150 is also detected by a height switch, represented at 191, which is mounted on the reach support 176 and actuated whenever the height switch 191 is disengaged from a track (not shown) on the mast member 186. The height switch 191 is positioned so that it is actuated whenever the top of the load back rest 160 extends above the top of the fixed mast member 182, i.e., the collapsed height as shown by dashed line 34. As used herein, the term "collapsed height" refers to the top of the lower mast member 182 as represented by the dashed line 34. Thus, "below the collapsed height" means that neither the back rest 160 nor either of the mast members 184 or 186 extends above the dashed line 34.

The height switch 191 can be mounted on the reach support 176 at a height corresponding to the height of the back rest 160 if different height load back rests are used. However, it may be preferred to mount the height switch 191 at a single position corresponding to the tallest load back rest which is provided for a given series of trucks. In this way, the switch 191 is ensured to be actuated at or before extension of the back rest above the top of the mast member 182 regardless of which back rest may be used on a truck.

Figure 3A:
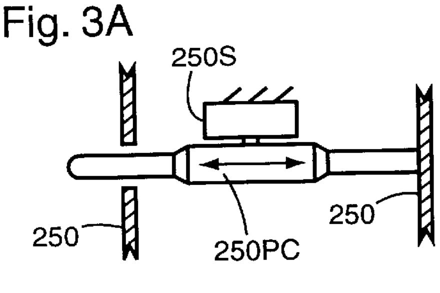
FIG. 3A illustrates a preferred embodiment of the tilt switch of FIG. 3.
Figure 3B:
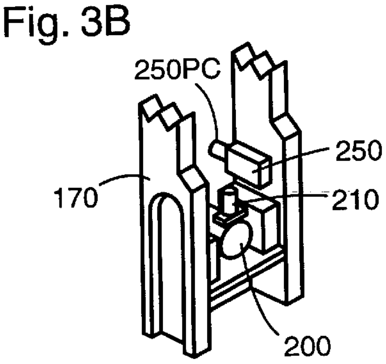
FIG. 3B is a perspective view of a portion of a carriage assembly showing a tilt cylinder, a weight sensor and a tilt switch.

The forks 150 may be tilted through a range shown by the arrow 195 by means of a hydraulic tilt cylinder 200 located between a bracket attached to the forks 150 and the carriage assembly 170, see FIGS. 2 and 3. The weight of the load on the forks 150 is measured by a pressure transducer which serves as a weight sensor 210 that is attached to a hydraulic line connected to the tilt cylinder 200, see FIG. 4. A tilt switch 250 is actuated whenever the forks 150 are at their full tilt down or full tilt back positions, as will be explained.

Figure 4:
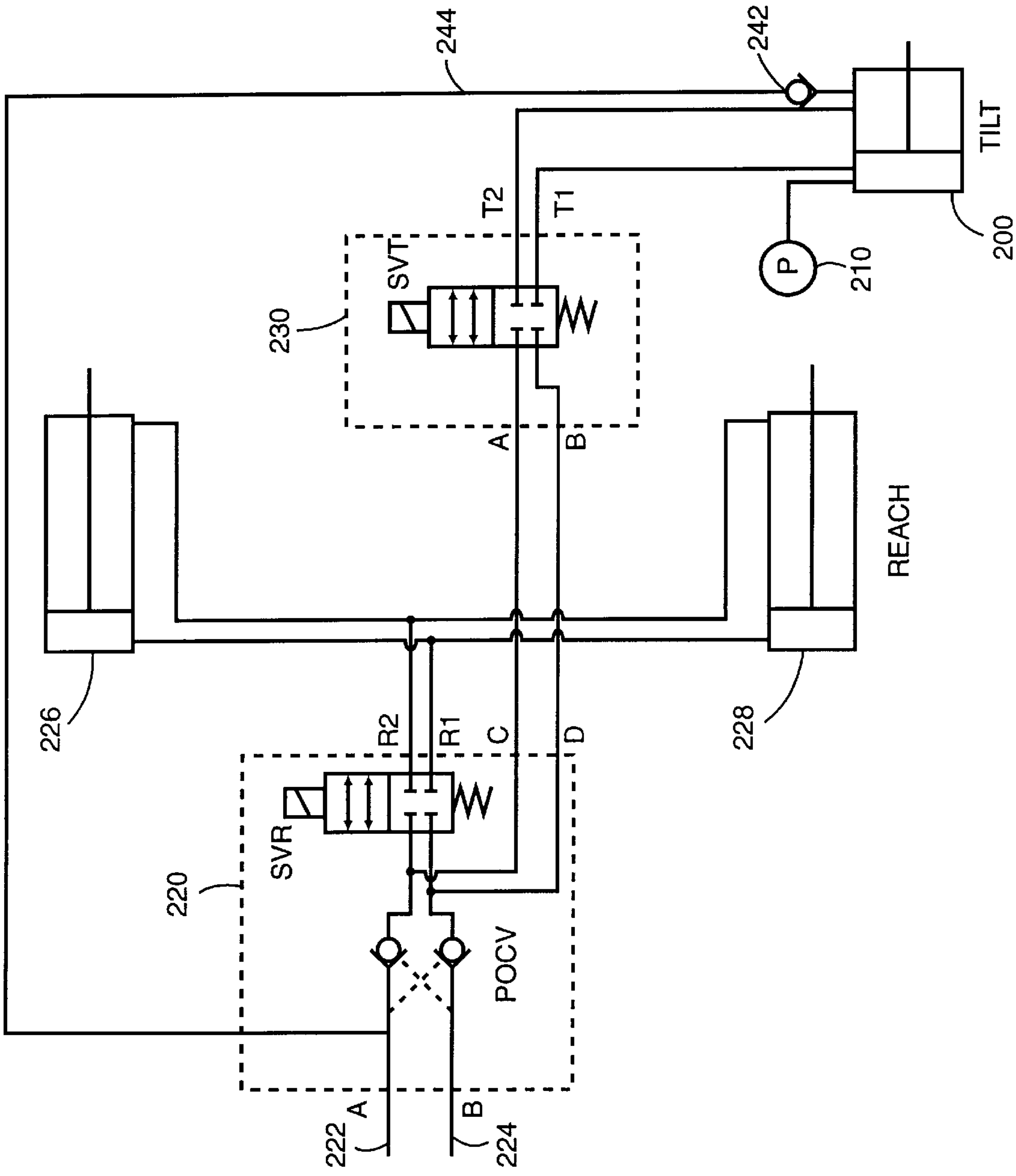
FIG. 4 is a hydraulic schematic diagram showing the weight sensor connected to the tilt cylinder.

Referring now to FIG. 4, which is a hydraulic schematic diagram for the reach, side shift and tilt functions of the fork lift truck 100 shown in FIG. 2, hydraulic fluid under pressure is supplied to a hydraulic manifold 220 in the carriage assembly 170 by hydraulic input lines 222 and 224. Within the manifold 220 are a pair of check valves POCV and a solenoid valve SVR which controls and directs hydraulic fluid to a pair of reach cylinders 226 and 228.

Hydraulic fluid under pressure is also applied to a manifold 230 which includes a solenoid valve SVT for controlling the operation of the tilt cylinder 200. A load sensing check valve 242 is included in a return line 244, which is in turn connected to the input line 222. The weight sensor 210 is connected to one side of the tilt cylinder 200 to monitor the pressure of the hydraulic fluid in the tilt cylinder 200 which pressure is a function of the weight being carried by the forks 150, provided, of course, that the forks 150 have not reached a mechanical stop (not shown) due to tilting movement of the forks 150. Tilting of the forks 150 is monitored by the switch 250 which is activated by the forks 150 immediately prior to the forks 150 reaching the mechanical stop so that the tilt switch 250 is actuated whenever the forks 150 are in their full tilt down or full tilt back positions. Preferably, the tilt switch 250 comprises a single switch 250S which is engaged with a plunger/cam 250PC which is spring biased to extend outside the tilt switch 250, see FIGS. 3 and 3A. Advantageously, the switch 250S is activated whenever the plunger 250PC is forced back into the tilt switch 250 or extended a defined distance beyond the tilt switch 250 so that both full tilt down and full tilt back positions can be detected using the single switch 250S.

Figure 5:
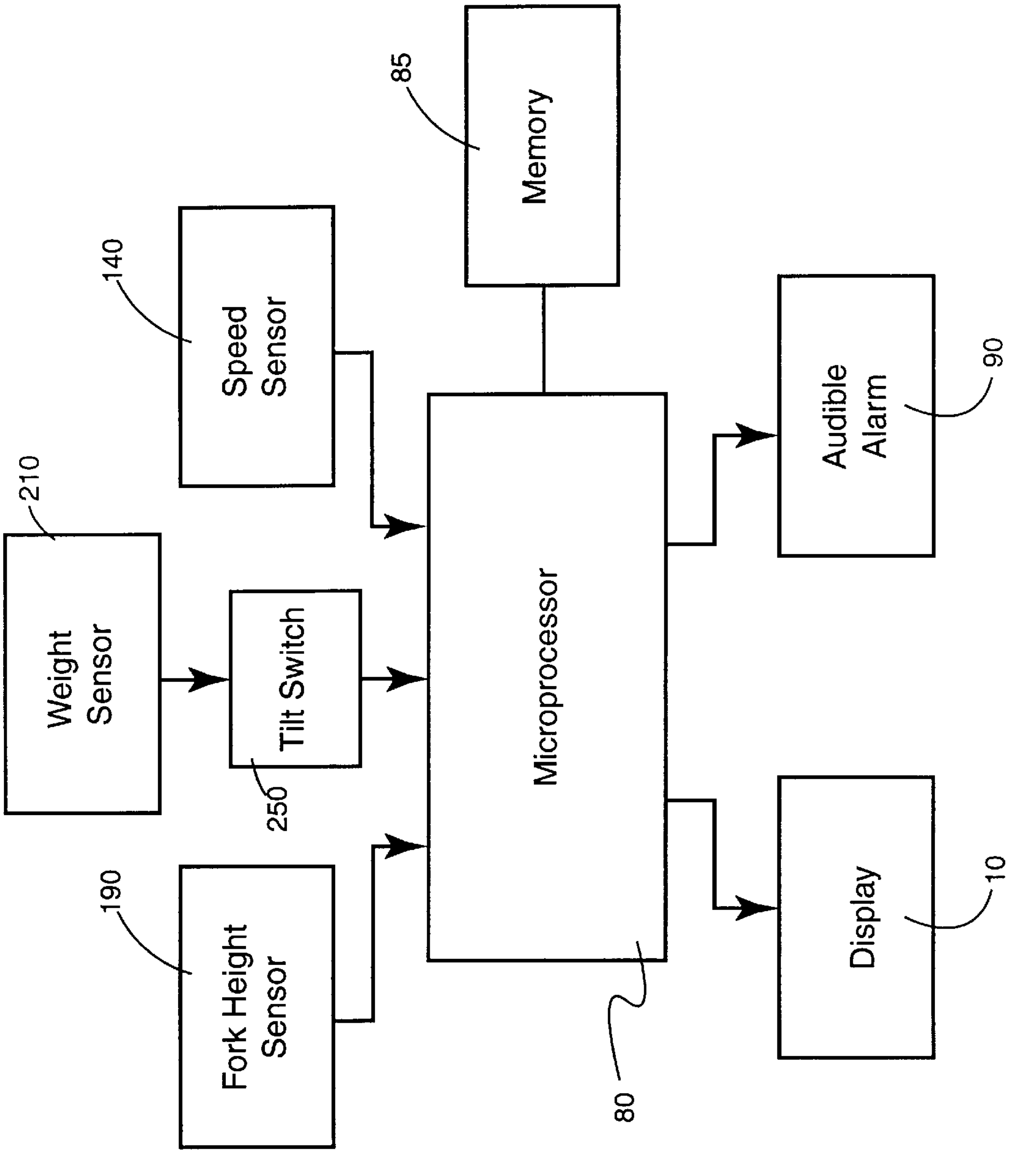
FIG. 5 is an electrical block diagram of the present invention.

In this way, the tilt switch 250 is actuated when the weight signal generated by the weight sensor 210 may not be accurate due to the forks 150 being tilted into contact with the mechanical stop. As illustrated in FIG. 5, the tilt switch 250 and more particularly the switch 250S includes a normally closed contact which is connected in series with the weight sensor 210 so that the signal from the weight sensor 210 is interrupted whenever the forks 150 are tilted into engagement with the mechanical stop and the weight signal is not accurate. Whenever the forks 150 are at either the full tilt down position or full tilt back position, as detected by the tilt sensor or tilt switch 250, and the weight sensor 210 does not accurately reflect the weight of the load on the forks 150, none of the indicators of the display panel 10 are energized and the message MONITOR DISABLED is displayed on the text display screen 60.

The weight sensor 210 is preferably a transducer which provides an output signal proportional to weight. The output signal from the weight sensor 210 is used to determine the weights of the loads on the forks 150 and thereby the height zone lamps C1–C4 to be lighted to indicated recommended height ranges for the loads. The weight sensor 210 can also be a simple switch, in which case, the only display would be weight above and below the threshold level of the switch, or in other words, above and below a predetermined level.

The electrical block diagram of FIG. 5 shows a speed sensor illustrated as the tachometer 140, the fork height sensor 190, the weight sensor 210, and the tilt switch 250 connected to a control circuit taking the form of a microprocessor 80 in the illustrated embodiment which processes the input data from these devices in accordance with data representative of the truck 100 recorded in a storage device represented by a memory 85. The results of this processing are then displayed on the display panel 10, and, if necessary, audible alarm 90 is sounded. The microprocessor includes a lamp flashing mechanism.

Figure 8:
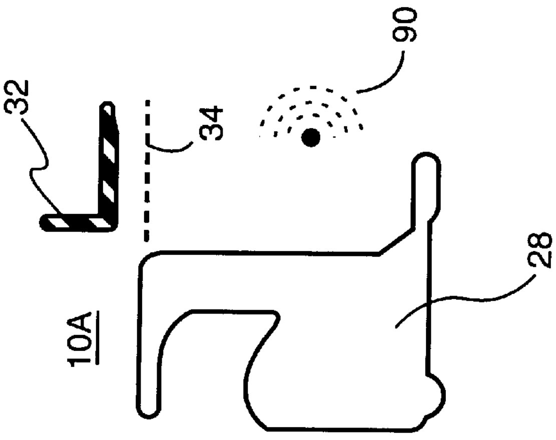
FIG. 8 illustrates the display panel of FIG. 6 showing the fork symbol flashing and an audible alarm sounding when the forks are above the collapsed height and the vehicle's speed is above a predetermined value.
Figure 7:
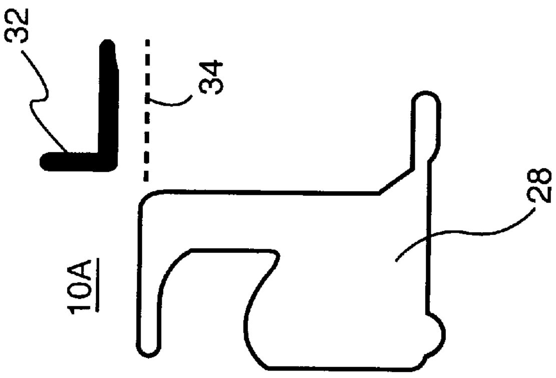
FIG. 7 illustrates the display panel of FIG. 6 showing the fork symbol illuminated when the forks are above a collapsed height and the truck's speed is below a predetermined value.
Figure 6:
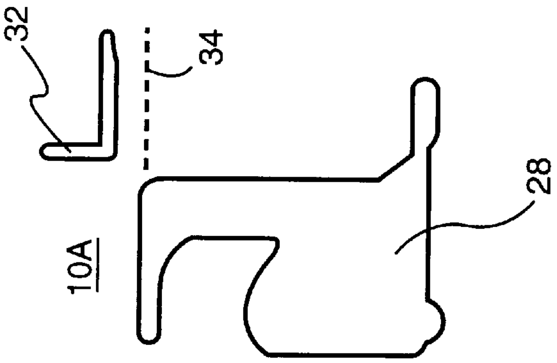
FIG. 6 illustrates a portion of a display panel for a lift truck incorporating a second, simplified embodiment of the present invention for use on a truck without a weight sensor and showing a representation of a lift truck and a fork symbol which can be illuminated.

Referring now to FIGS. 6–8, wherein a second simplified embodiment of a display panel 10*a* for a lift truck without a weight sensor but having a sensor that detects when the forks are above the collapsed height represented by the dashed line 34 and a truck speed sensor. FIG. 6 shows a representation 28 of a lift truck with the forks represented by a fork lamp 32 which is not energized when the forks are below the collapsed height. In FIG. 7, fork lamp 32 is on or energized when the forks of the truck are above the collapsed height line 34 and the vehicle's speed is below a predetermined value. FIG. 8 shows the fork lamp 32 flashing and an audio alarm 90 sounding when the forks of the truck are above the collapsed height 34 and the truck's speed is above a predetermined value.

Reference is now made to FIGS. 2, 5 and 9–21. The weight of the load on the forks 150 is measured by the weight sensor 210 and used by the microprocessor 80, together with truck data stored in the memory 85, to determine a recommended height to which a load of that weight should be lifted. The truck load weight/recommended height data in the illustrated embodiment is based on having the load center 24 inches from the back of the load back rest 160 and 24 inches above the forks 150. However, in the present invention, truck data can be provided for a plurality of load centers with the appropriate set of data being manually selected by the owner or operator of the truck depending upon specific loads being handled. Specific data for one of a plurality of load centers can also be selected automatically if a load moment sensor is available on the truck.

As is well known, the load weight (height of the forks) that is recommended to be carried by a fork lift truck is a function of the height of the forks (weight of the load); the higher the forks (load weight), the lower the recommended load (fork height), as represented by symbols L1–L4 in FIG. 1. According to the present invention, the height zone indicators C1–C4 are energized to indicate the recommended maximum height or range of height to which the forks should be raised for the weight of a sensed load on the forks. For example for a truck represented by height/weight specification data shown in Table 1, the height zone indicator lamps C1–C4 are energized as shown. Thus, if the sensed weight on the forks is less than or equal to 2500 pounds, for example, all the height zone indicator lamps C1–C4 are illuminated since for such weights there is no limitation on the recommended height to which the forks can be raised. Therefore, when the actual weight is less or equal to 2500 pounds, the maximum recommended fork height is 321 inches, the maximum lift height for the truck. As another example of interpreting Table 1, if the sensed weight on the forks is 3200 pounds, then only lamps C1 and C2 would be illuminated, and the maximum recommended fork height is 270 inches. Other examples are described below with reference to the drawing figures.

TABLE 1

| Indicator | Weight (pounds) | Max. Height (inches) |
|---|---|---|
| C4 | ≦2500 | 321 |
| C3 | ≦3000 | 300 |
| C2 | ≦4000 | 270 |
| C1 | ≦4500 | 240 |

If the interrelated specifications for load weight, fork height and truck speed are violated, the microprocessor 80 lights certain lamps on the display panel 10 or 10*a*. The microprocessor 80 may also make some lamps flash, sound an audible alarm, and in some cases, generate a text message on the text display screen 60, as illustrated in the flow chart of FIG. 21 and shown in Table 2 for the illustrated embodiment.

TABLE 2

| HEIGHT/WEIGHT LIMITS | SPEED LIMIT | LAMP 35 | ALARM 90 | TEXT 60 |
|---|---|---|---|---|
| Under Spec | <Creep | Off | Off | None |
| Under Spec | ≧Creep | Off | On | None |
| Over Spec | <Creep | On | On | CHECK LOAD |
| Over Spec | ≧Creep | On | On | CHECK LOAD |

Figure 21:
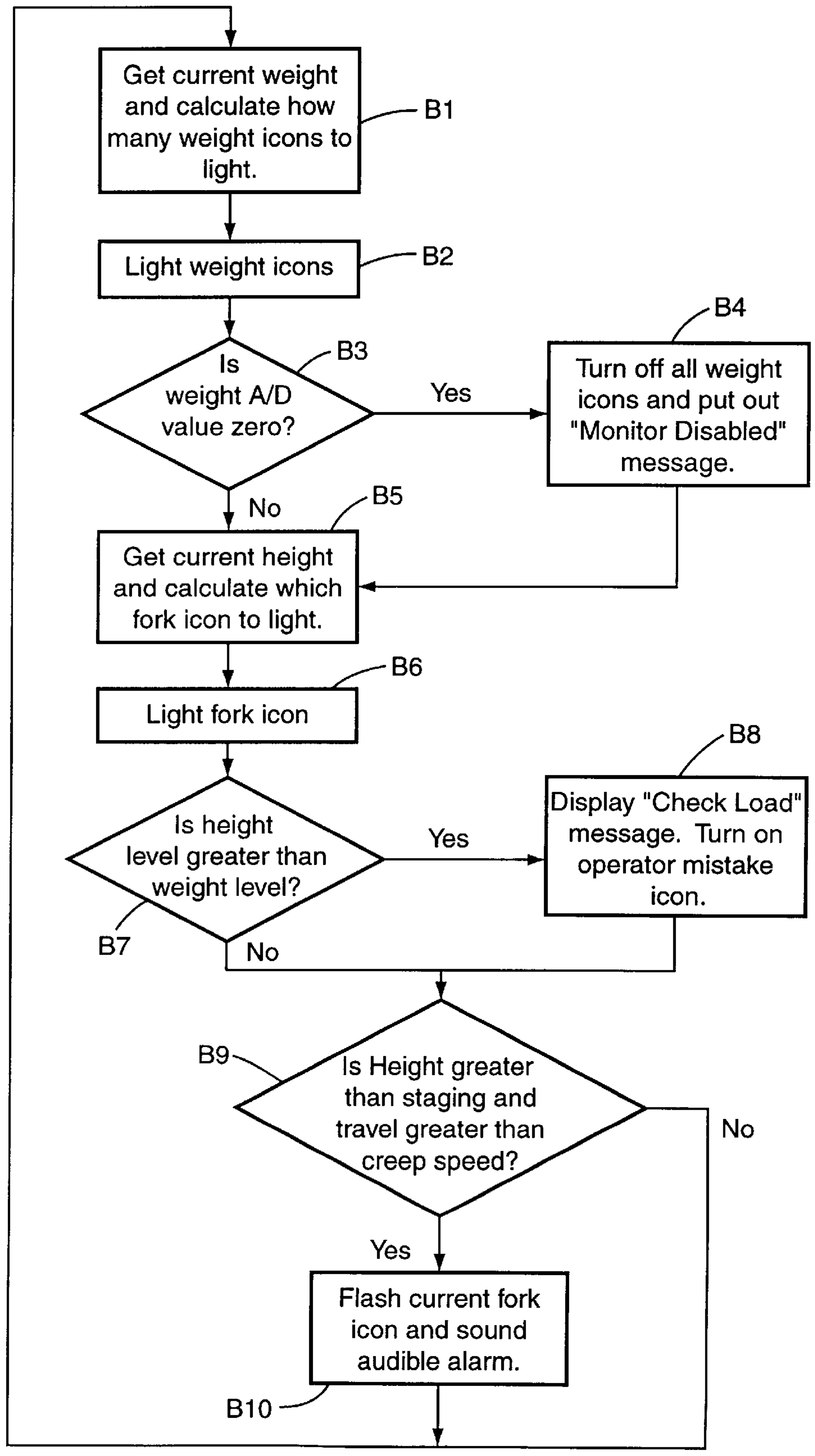
FIG. 21 is a flow chart showing the operation of a microprocessor which controls the alerting system of the present invention.

The microprocessor 80 continuously processes the signals coming in from the weight sensor 210, the fork height sensor 190 and the speed sensor 140. While these signals can be processed in a number of ways for the present invention, FIG. 21 illustrates a currently preferred processing flow. In FIG. 21, the current weight signal is read and used to calculate the recommended fork height for the corresponding weight and the number of height zone indicator lamps C1–C4 or icons which should be illuminated to advise the truck operator of the recommended maximum fork lift height, see block B1. The corresponding height zone indicator icons are then illuminated, see block B2.

A check is then made to determine whether the forks 150 have been tilted to the point that they contact the mechanical rest as indicated by actuation of the tilt switch 250. If the tilt switch 250 is actuated, the signal from the weight sensor 210 is interrupted which is sensed at block B3 by the value of the weight signal from an analog to digital (A/D) converter is equal to zero. If so, all weight icons and other indicators are turned off and a MONITOR DISABLED message is displayed on the text display screen 60, see block B4.

The current fork height signal is read and used to determine which one of the fork height lamps H1–H4 or icons to illuminate to indicate to the operator of the truck the height or height zone of the forks 150, see block B5. The determined fork height icon is then illuminated, see block B6. Next, the fork height is compared to the recommended fork height based on the weight of the load on the forks 150 as determined in block B1, see block B7. If the fork height is greater than or equal to the recommended fork height based on load weight or weight level, a CHECK LOAD message is displayed on the text display screen 60 and the operator correctable error indicator 35 is illuminated, see block B8. If the fork height is less than the weight level, no such action is taken.

The fork height is then compared to the staging or collapsed height for the truck and the signal from the truck speed sensor 140 is read, see block B9. If the fork height is greater than the collapsed height for the truck and the travel speed is greater than a predetermined maximum value, for example 1.5 miles per hour (mph), also known as creep speed, then the illuminated fork icon is flashed and the audible alarm 90 is sounded, see block B10. This processing sequence is then repeated to maintain the alerting system of the present invention up to date for current truck operating conditions. These operations will be clarified by the following examples which represent specific truck operating conditions and how the alerting system responds.

Figure 9:
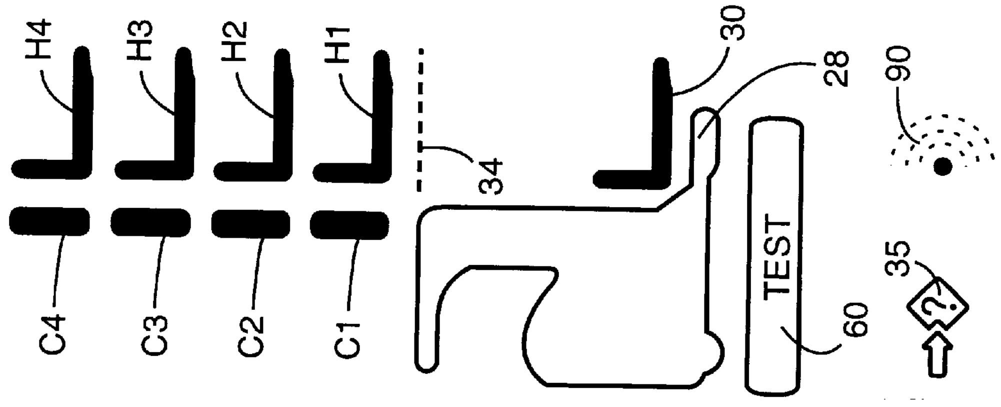
FIG. 9 illustrates a portion of the enhanced display panel of FIG. 1 which is shown as it appears upon initial startup, i.e., all indicators are illuminated, the text display screen indicates TEST mode, and the audible alarm is sounding.

In operation, when the fork lift truck 100 is initially turned on, the microprocessor 80 initiates a self check procedure which causes each of the lamps in the display to be energized, displays the word TEST on the text display screen 60, and causes the audible alarm 90 to sound briefly as shown in FIG. 9. The indicator lamps shown in FIGS. 6 to 20 may be off, on or flashing. In the drawings, when off, a lamp is represented by an outline, for example as shown by H1–H4 in FIG. 10; when on, a lamp is represented by a solid shape, for example as shown by C1–C4 in FIG. 10; when flashing, a lamp is represented by cross-hatching, for example as shown by H1 in FIG. 14.

Figure 10:
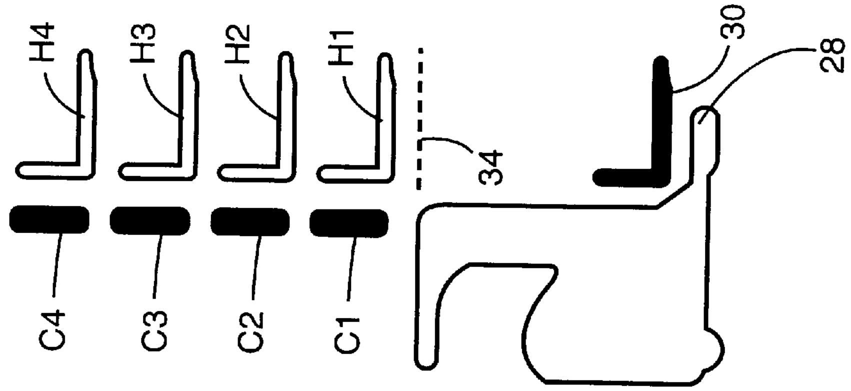
FIG. 10 illustrates the enhanced display of FIG. 9 when the forks are below the collapsed height and the load on the forks does not recommend a limitation on the height of the forks.

If the weight of the load on the forks 150, as detected by the weight sensor 210, is below the weight permitted for elevation of the forks to full height, and the forks are below the collapsed height, then the display will be as shown in FIG. 10. All of the height zone indicator lamps C1–C4 are illuminated indicating that the operator may raise the forks 150 to their maximum height. It is to be understood that while four zones are described, the display may include any reasonable number of zones greater than four or less than four. The lamp 30 is also energized to indicate that the forks are in a free lift zone beneath the collapsed height for the truck.

Figure 11:
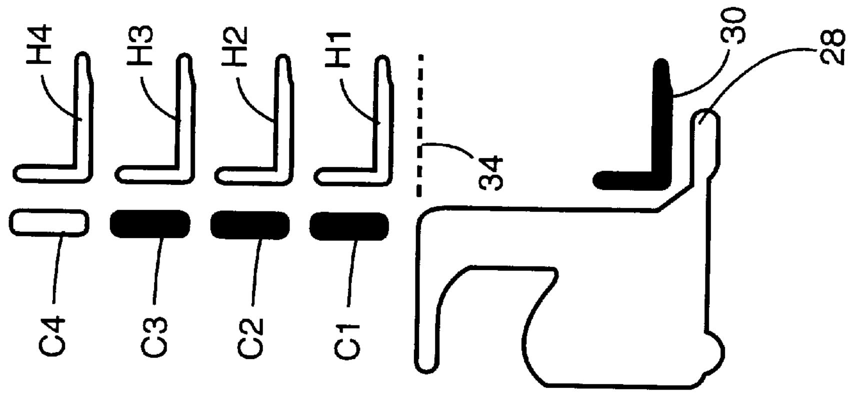
FIG. 11 is similar to FIG. 10 but shows the forks below the collapsed height with the load on the forks corresponding to a recommended limitation of the height of the forks to a height zone H3.
Figure 12:
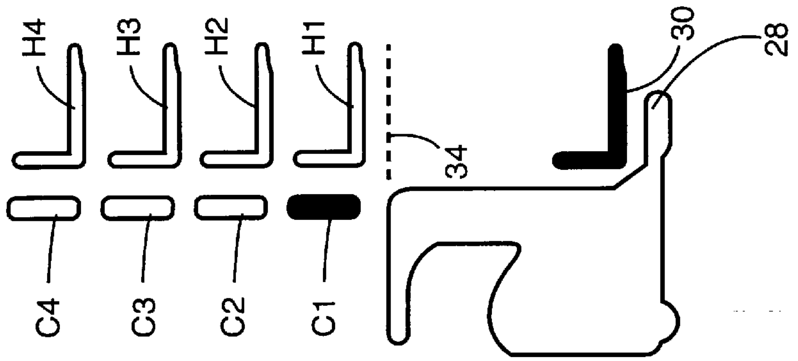
FIG. 12 is a similar to FIGS. 10 and 11 but shows the forks below the collapsed height with the load on the forks resulting in a reduced recommended height limitation to a height zone H1.

If the weight of the load on the forks 150 exceeds the weight recommended for full height extension of the forks, then the display will appear as shown in FIGS. 11 and 12. In FIG. 11, the weight of the load on the forks 150 is less than or equal to 3000 pounds so that the forks 150 should not be raised above the height represented by height zone indicator C3 and, accordingly, the height zone indicators C1–C3 are illuminated while the height zone indicator C4 is not illuminated. Similarly, in FIG. 12, if additional weight is added to the forks 150, the maximum height should be limited to the height represented by illumination of only the height zone indicator C1.

Figure 14:
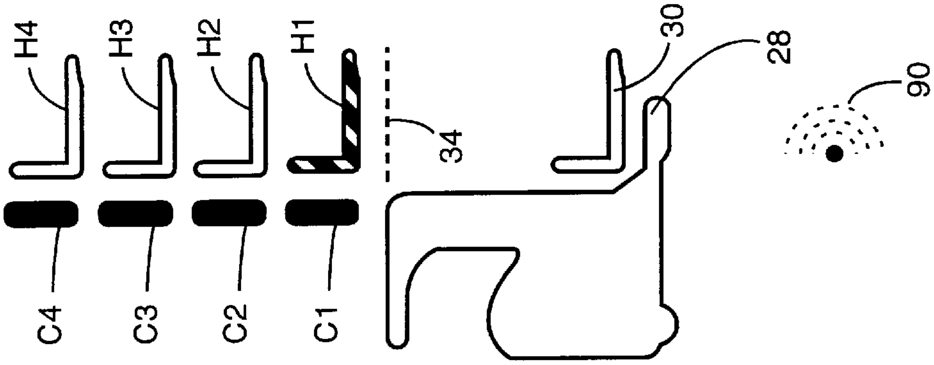
FIG. 14 is a view similar to FIG. 13, but with the vehicle's speed above the predetermined value so that the fork height indicator is flashing and the audible alarm is sounding.
Figure 13:
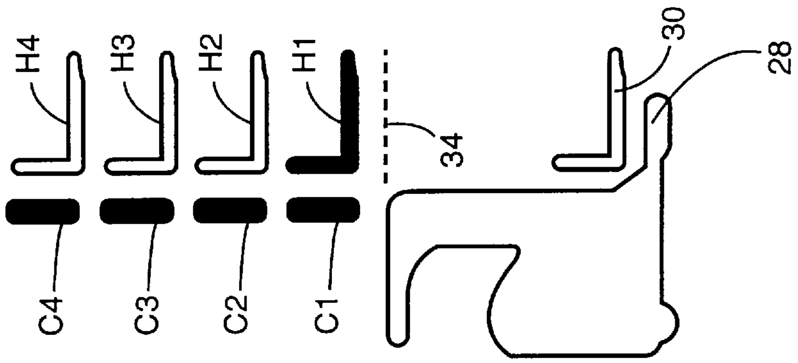
FIG. 13 illustrates the enhanced display of FIG. 9 when the forks are above the collapsed height, the load on the forks does not recommend a fork height limitation and the travel speed of the truck is below a predetermined value.

When the forks 150 are moved above the collapsed height represented by the dashed line 34 in FIG. 2, then the lamp 30 is extinguished. The actual fork height (in zones) is represented by energizing one of the fork height indicator lamps H1–H4. Thus, in FIG. 13–16, the forks 150 are shown as being raised above the collapsed height, and therefore the forks and/or mast of the truck extends above the collapsed height, i.e., dashed line 34, which represents the minimum height of the truck, and into the first zone, H1. In FIG. 13 the weight of the load permits full height extension of the mast or maximum height of the forks, as shown by illumination of all of the height zone indicator lamps C1–C4, and the speed of the truck, as monitored by speed sensor or tachometer 140, is below 1.5 mph, creep speed. FIG. 14 is similar to FIG. 13 except that the truck's speed is equal to or greater than 1.5 mph, creep speed. As shown, the lamp H1 is flashing and an audible alarm 90, typically a chime, is sounding to alert the operator to the operating conditions.

Figure 15:
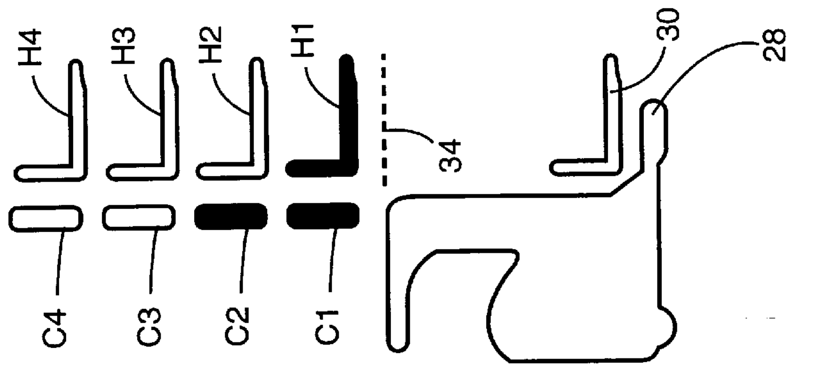
FIG. 15 illustrates the enhanced display of FIG. 9 when the forks are above the collapsed height, but below the maximum recommended height for the load on the forks, and the travel speed is below a predetermined value.
Figure 16:
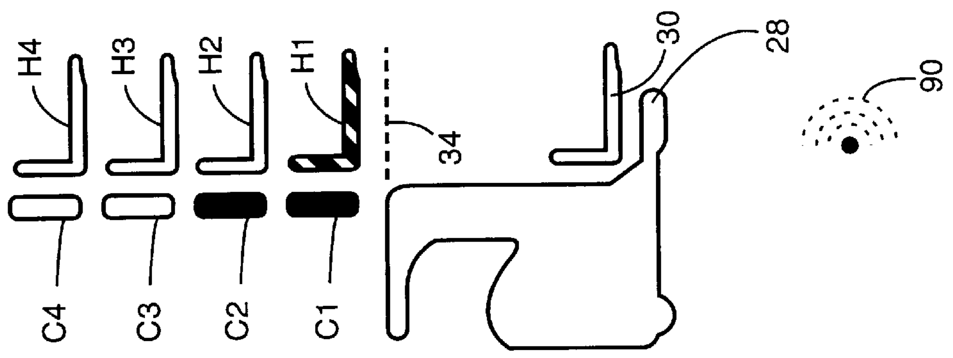
FIG. 16 is a view similar to FIG. 15, but with the travel speed above the predetermined value so that the fork height indicator is flashing and the audible alarm is sounding.

FIGS. 15 and 16 are similar to FIG. 13 and 14, but the load on the forks is greater so that a lower maximum fork height is recommended. That is, the maximum recommended fork height is limited to the height zone indicated by the height zone indicator C2. Accordingly, to be in compliance with recommend truck operation, the forks 150 should only be raised to the height represented by height zone lamp C2, or fork height zone H2. Of course, the operator can move the forks to any height since the invention of the present application does not control or limit truck operation but only alerts the operator to operating conditions which should be of concern to the operator.

Figure 17:
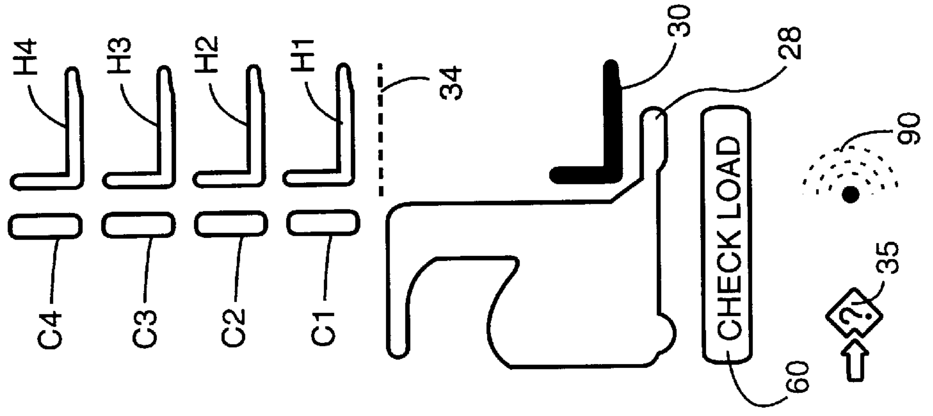
FIG. 17 illustrates the enhanced display of FIG. 9 when the forks are below the collapsed height, but the overall load capacity of the truck has been exceeded so that the operator correctable error indicator is lighted and CHECK LOAD is displayed on the text display.
Figure 20:
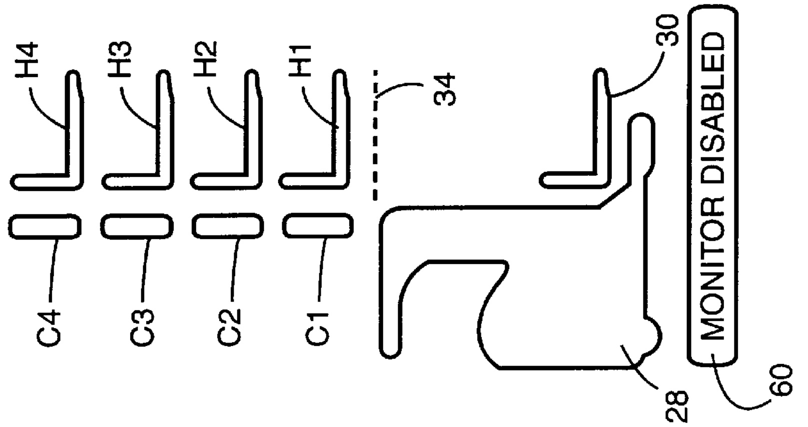
FIG. 20 shows the enhanced display of FIG. 9 when the forks have been tilted to either the full up or full down position which disables the display and is indicated with MONITOR DISABLED being displayed on the text display.

If the load on the forks is greater than the recommended maximum for the truck, with the forks 150 in the lowermost position, then the display 10 appears as shown in FIG. 17. None of the lamps C1–C4 are energized, since the weight on the forks is above the maximum for even zone C1, the operator correctable error indicator 35 is energized, and a message CHECK LOAD is displayed on the text display screen 60.

Figure 19:
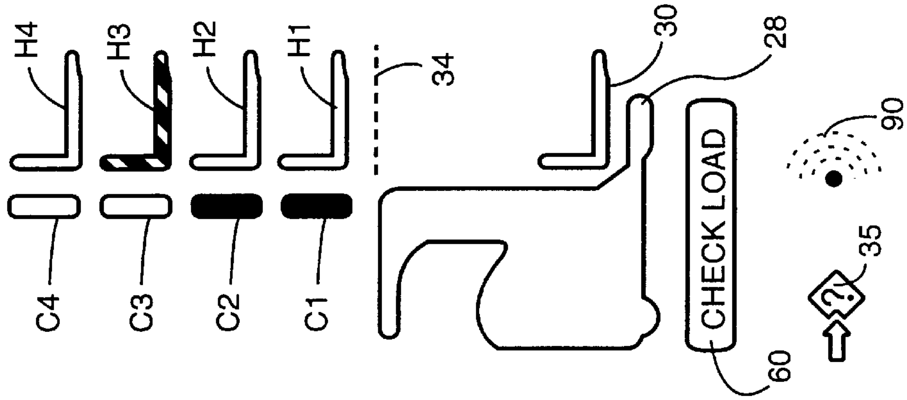
FIG. 19 is a view similar to FIG. 18 but with the travel speed above the predetermined value so that the fork height indicator is flashing, CHECK LOAD is displayed on the text display and, the audible alert is sounding.
Figure 18:
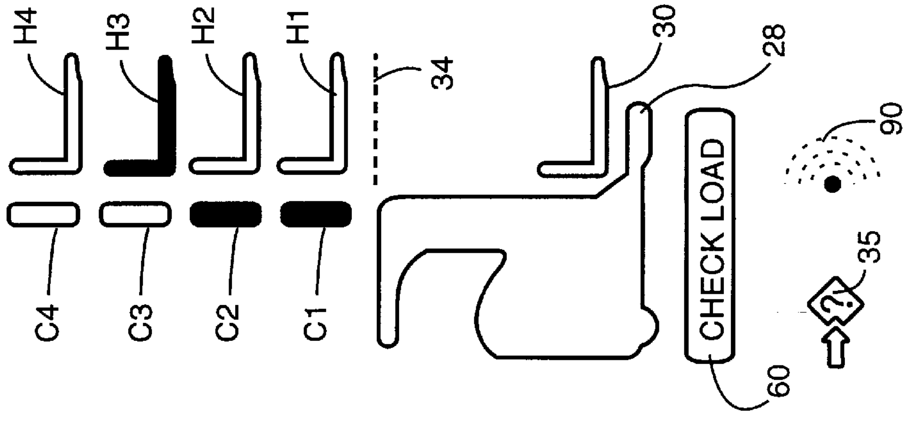
FIG. 18 illustrates the enhanced display of FIG. 9 when the forks are above both the collapsed height and the recommended weight height level, i.e., the fork height recommended in view of the weight of the load on the forks, and truck travel speed below the predetermined value so that the operator correctable error indicator is lighted and CHECK LOAD is displayed on the text display.

Similarly, if the forks are raised above the recommended height based on the sensed weight of the load on the forks 150, the display appears as shown in FIG. 18. In both FIGS. 17 and 18, the speed of the truck is less than the predetermined creep speed. If the speed is increased to equal or exceed the so-called creep speed, then the display will appear as shown in FIG. 19 where the fork height indicator lamp H3 is flashing and the audible alarm 90 is sounding.

Having thus described the invention of the present application in detail and by reference to preferred embodiments thereof, it will be apparent that modifications and variations are possible without departing from the scope of the invention defined in the appended claims.

What is claimed is:

1. A fork lift truck comprising:

a truck speed sensor;

a mast carrying forks which can be moved in height between a lowered position and desired raised positions;

a fork height sensor; and an alerting system indicating status of said fork height and truck speed to an operator of said truck, said alerting system comprising:

a control circuit responsive to signals generated by said truck speed sensor and said fork height sensor; and an indicator connected to an output of said control circuit, said indicator being illuminated by said control circuit when said forks are raised above a predetermined height and flashed by said control circuit when said forks are raised above said predetermined height and truck speed is above a predetermined speed.

2. A fork lift truck as claimed in claim 1 wherein said alerting system further comprises an audible alarm connected to an output of said control circuit, said audible alarm being sounded by said control circuit whenever said forks are raised above said predetermined height and truck speed is above said predetermined speed.

3. A fork lift truck as claimed in claim 1 wherein said alerting system further comprises a representation of a fork lift truck and wherein said indicator is in the form of a fork positioned above said truck representation.

4. A fork lift truck as claimed in claim 1 wherein said fork height sensor senses whether said forks are at or above a collapsed height or below a collapsed height.

5. A fork lift truck as claimed in claim 1 wherein said indicator comprises a lamp.

6. A fork lift truck comprising:

a mast carrying forks which can be moved in height between a lowered position and desired raised positions;

a fork height sensor;

a fork load weight sensor; and an alerting system indicating sensed fork height and sensed fork load weight to an operator of said truck, said alerting system comprising:

a storage device storing data correlating recommended fork heights and fork load weights;

a control circuit responsive to said data from said storage device and signals generated by said fork height sensor and said fork load weight sensor;

a plurality of height zone indicators coupled to said control circuit, said height zone indicators being selectively illuminated by said control circuit according to sensed weight of a load on said forks;

a plurality of fork height indicators coupled to said control circuit, said fork height indicators being selectively illuminated according to the height of said forks; and an operator correctable error indicator coupled to said control circuit for alerting an operator of said truck whenever said forks are raised above a recommended maximum height for a given load weight.

7. A fork lift truck as claimed in claim 6 wherein at least one of said indicators comprise a lamp.

8. A fork lift truck as claimed in claim 6 wherein said operator correctable error indicator is activated when a given load weight exceeds a maximum load weight for said fork lift truck.

9. A fork lift truck comprising:

a mast carrying forks which can be moved in height between a lowered position and desired raised positions;

a hydraulic tilt cylinder for tilting said forks through a fork tilt range;

a fork height sensor;

a fork load weight sensor, said weight sensor being coupled to said tilt cylinder for monitoring the pressure of hydraulic fluid in said tilt cylinder which pressure is a function of the weight being carried by said forks; and an alerting system indicating sensed fork height and sensed fork load weight to an operator of said truck, said alerting system comprising:

a storage device storing data correlating recommended fork heights and fork load weights;

a control circuit responsive to said data from said storage device and signals generated by said fork height sensor and said fork load weight sensor;

a plurality of height zone indicators coupled to said control circuit, said height zone indicators being selectively illuminated by said control circuit according to sensed weight of a load on said forks;

a plurality of fork height indicators coupled to said control circuit, said fork height indicators being selectively illuminated according to the height of said forks; and an operator correctable error indicator coupled to said control circuit for alerting an operator of said truck whenever said forks are raised above a recommended maximum height for a given load weight.

10. A fork lift truck as claimed in claim 9 further comprising a fork tilt monitoring device, said fork tilt monitoring device being actuated when said forks are tilted to extremes of said fork tilt range and being coupled to said control circuit to disable said alerting system when actuated.

11. A fork lift truck as claimed in claim 10 wherein said fork tilt monitoring device comprises a switch.

12. A fork lift truck as claimed in claim 9 wherein said alerting system further comprises a text display screen coupled to said control circuit for visually instructing said operator concerning sensed fork height, sensed fork load weight and sensed truck speed.

13. A fork lift truck as claimed in claim 12 further comprising a fork tilt monitoring device, said fork tilt monitoring device being actuated when said forks are tilted to extremes of said fork tilt range and being coupled to said control circuit to disable said alerting system when actuated, said control circuit displaying a monitor disabled message on said text display screen when said fork tilt monitoring device is actuated.

14. A fork lift truck comprising:

a mast carrying forks which can be moved in height between a lowered position and desired raised positions;

a truck speed sensor;

a fork height sensor;

a fork load weight sensor; and an alerting system indicating sensed fork height and sensed fork load weight to an operator of said truck, said alerting system comprising:

a storage device storing data correlating recommended fork heights and fork load weights;

a control circuit responsive to said data from said storage device and signals generated by said fork height sensor and said fork load weight sensor;

a plurality of height zone indicators coupled to said control circuit, said height zone indicators being selectively illuminated by said control circuit according to sensed weight of a load on said forks;

a plurality of fork height indicators coupled to said control circuit, said fork height indicators being selectively illuminated according to the height of said forks; and an operator correctable error indicator coupled to said control circuit for alerting an operator of said truck whenever said forks are raised above a recommended maximum height for a given load weight, said truck speed sensor being coupled to said control circuit which causes said selectively illuminated fork height indicators to flash when truck speed exceeds a predetermined value and sensed fork height is above a collapsed height for said fork lift truck.

15. A fork lift truck as claimed in claim 14 wherein said alerting system further comprises an audible alarm coupled to said control circuit, said control circuit sounding said audible alarm when truck speed exceeds said predetermined value and sensed fork height is above a collapsed height for said fork lift truck.

16. A fork lift truck as claimed in claim 15 wherein said alerting system further comprises a text display screen to visually instruct said operator concerning sensed fork height, sensed fork load weight and sensed truck speed.

17. A fork lift truck comprising:

a mast carrying forks which can be moved in height between a lowered position and desired raised positions;

a truck speed sensor;

a fork height sensor;

a fork load weight sensor; and an alerting system indicating sensed fork height, sensed fork load weight and sensed truck speed to an operator of said truck, said alerting comprising:

a control circuit receiving input signals from said truck speed sensor, said fork height sensor and said load weight sensor;

a storage device storing data correlating fork load weights and recommended fork heights;

a representation of a fork lift truck on a display;

a plurality of height zone indicators on said display and responsive to said control circuit for representing load weight on said forks, said plurality of height zone indicators being placed above said representation of a fork lift truck in a vertical column and being selectively illuminated according to sensed load weight on said forks;

a plurality of fork height indicators on said display and responsive to said control circuit for representing sensed height of said forks, said plurality of fork height indicators including one fork height indicator placed relative to said representation of a lift truck in a position representing a lowered position of said forks, and a remainder of said plurality of fork height indicators equal in number to said plurality of height zone indicators and placed horizontally opposite therefrom, said plurality of fork height indicators being selectively illuminated by said control circuit according to sensed fork height and said remainder of said plurality of fork height indicators being selectively flashed by said control circuit whenever said forks are raised above a predetermined height and the speed of said truck is above a predetermined speed; and an operator error indicator activated by said control circuit to provide an output signal to alert said operator whenever said forks are raised above a recommended height for a given load weight.

18. A fork lift truck as claimed in claim 17 wherein at least one of said indicators comprise a lamp.

19. A fork lift truck as claimed in claim 17 wherein said operator error indicator is a symbol which is illuminated to indicate when said forks are raised above a recommended height for a given load weight.

20. A fork lift truck as claimed in claim 17 wherein said alerting system further comprises a text display screen to visually instruct said operator concerning sensed fork height, sensed fork load weight and sensed truck speed.

21. A fork lift truck as claimed in claim 17 further including an audible alarm which is sounded by said control circuit whenever said forks are above a predetermined height and sensed speed of said fork lift truck exceeds a predetermined value.

22. A fork lift truck as claimed in claim 17 wherein only one of said plurality of fork height indicators is energized at any time during operation of said truck.

23. A method of displaying a recommended maximum height to which forks of a fork lift truck should be raised under a given load condition comprising the steps of:

measuring weight of a load carried by said forks;

measuring height of said forks;

comparing said height of said forks to said weight of said load;

providing a visible indication whenever the height of the forks exceeds a recommended height limit dictated by a measured load weight;

monitoring speed of said truck; and providing a visible and audible indication whenever said speed of said truck exceeds a predetermine speed and said forks are raised above a predetermined height.

* * * * *